(12) United States Patent
Nakama

(10) Patent No.: US 8,792,778 B2
(45) Date of Patent: Jul. 29, 2014

(54) VIDEO DATA DISPLAY APPARATUS AND METHOD THEREOF

(75) Inventor: Motoki Nakama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 12/711,856

(22) Filed: Feb. 24, 2010

(65) Prior Publication Data

US 2010/0239225 A1 Sep. 23, 2010

(30) Foreign Application Priority Data

Mar. 19, 2009 (JP) ................................. 2009-069007

(51) Int. Cl.
*H04N 5/783* (2006.01)

(52) U.S. Cl.
CPC ..................... *H04N 5/783* (2013.01)
USPC ........................................................ 386/343

(58) Field of Classification Search
CPC .... H04N 5/783; H04N 9/8205; H04N 9/8227
USPC .......................................... 386/241, 248, 343
See application file for complete search history.

(56) References Cited

U.S. PATENT DOCUMENTS

| | | | |
|---|---|---|---|
| 7,406,409 B2 | 7/2008 | Otsuka et al. | |
| 2005/0154987 A1 | 7/2005 | Otsuka et al. | |
| 2005/0198570 A1 | 9/2005 | Otsuka et al. | |
| 2006/0238653 A1* | 10/2006 | Tobita | 348/581 |
| 2008/0152299 A1 | 6/2008 | Ubillos | |
| 2008/0165396 A1* | 7/2008 | Brodersen et al. | 358/509 |
| 2008/0212881 A1* | 9/2008 | Hirakawa | 382/224 |
| 2008/0303942 A1* | 12/2008 | Chang et al. | 348/468 |
| 2010/0095234 A1* | 4/2010 | Lane et al. | 715/773 |
| 2010/0149325 A1* | 6/2010 | Fujiki | 348/79 |

FOREIGN PATENT DOCUMENTS

| | | |
|---|---|---|
| JP | 2001-238182 A | 8/2001 |
| JP | 2003-298981 A | 10/2003 |
| JP | 2004-104594 A | 4/2004 |
| JP | 2004-120553 | 4/2004 |
| JP | 2004-328218 A | 11/2004 |
| JP | 2004-363831 A | 12/2004 |
| JP | 2005-057380 A | 3/2005 |
| JP | 2005-223451 A | 8/2005 |
| JP | 2005-293680 A | 10/2005 |
| JP | 2006-345554 | 12/2006 |
| JP | 2007-184674 A | 7/2007 |

OTHER PUBLICATIONS

Apr. 1, 2013 Japanese Office Action, that issued in Japanese Patent Application No. 2009-069007.
Aug. 16, 2013 Japanese Office Action, that issued in Japanese Patent Application No. 2009-069007.

* cited by examiner

*Primary Examiner* — Thai Tran
*Assistant Examiner* — William Tran
(74) *Attorney, Agent, or Firm* — Cowan, Liebowitz & Latman, P.C.

(57) ABSTRACT

A video data display apparatus for reproducing and displaying video data calculates an operation speed based on an input user operation, determines a reproduction speed according to the calculated operation speed, and reproduces video data at the determined reproduction speed. Here, the video data display apparatus acquires section information indicating a section selected from the video data, and, in a case where the calculated operation speed exceeds a prescribed operation speed, determines the reproduction speed for performing reproduction, such that a reproduction speed of video data belonging to the selected section indicated by the section information is slower than a reproduction speed of video data not belonging to the selected section.

15 Claims, 12 Drawing Sheets

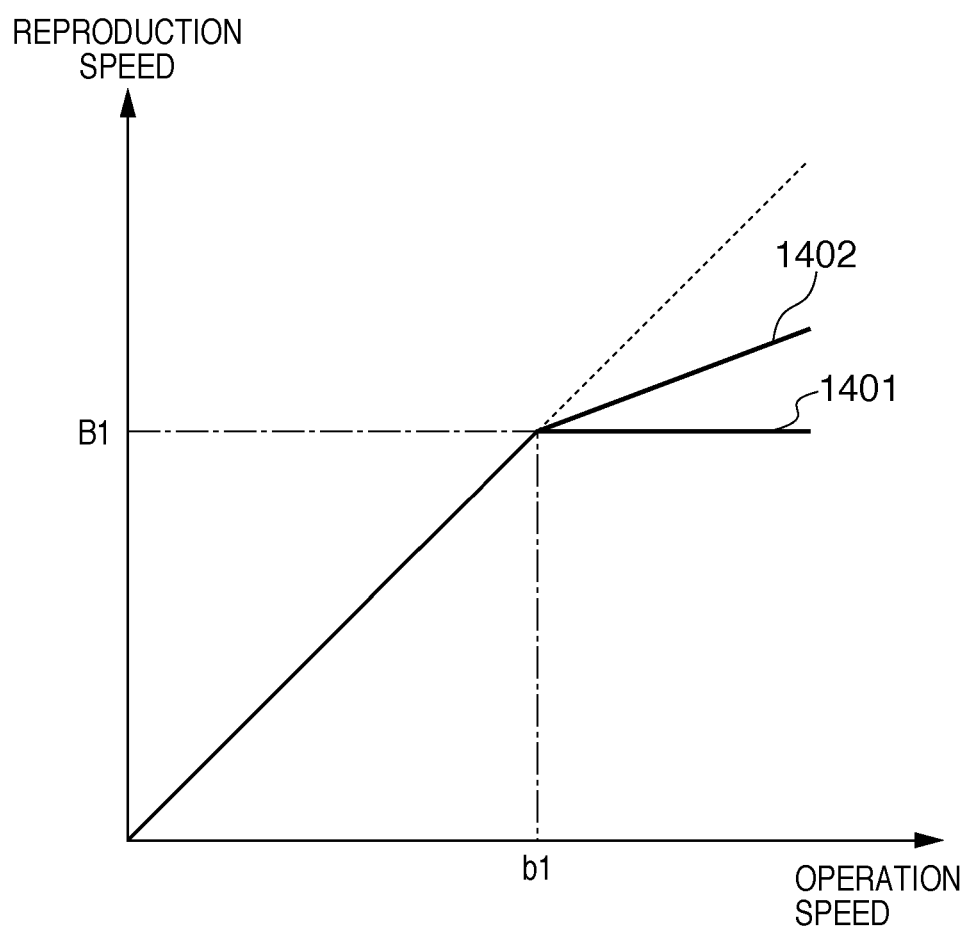
F I G. 13

VIDEO DATA DISPLAY APPARATUS AND METHOD THEREOF

BACKGROUND OF THE INVENTION

1. Field of the Invention

The present invention relates to a technique for displaying video data.

2. Description of the Related Art

As a result of enhancements in the performance and reductions in the price of digital devices, high-definition video data can now be easily captured even with low cost digital cameras, mobile telephones and the like in generally widespread use. Also, as a result of increases in the capacity of storage installed in these devices, it is now possible for anyone to store enormous amounts of video data. And a situation has arisen where storages are now overflowing with these enormous amounts of stored video data.

Retrieving and browsing desired scenes or the like from enormous amounts of video data is difficult in such a situation. For this reason, retrieval techniques and metadata annotation techniques that use various types of video analysis have been proposed. However, even if such conventional techniques are utilized, retrieving a desired scene with only various types of meta-information added to the data is difficult, especially with multimedia data such as video data. This is because without actually checking multimedia data such as video data visually, it is ultimately impossible to judge whether that data (scene) is a desired scene or not. In other words, with the conventional methods of retrieving and browsing video data, excessive amounts of time and daunting operations were needed to retrieve and check desired scenes from enormous amounts of video data.

For example, in the case of browsing video data, typical methods involve browsing video data one at a time while reproducing or fast forwarding, or browsing important-looking video scenes, using chapter frames or index frames generated and displayed by extracting video frames from video data at an arbitrary frame interval as a cue. As a result, retrieving and browsing video data takes time.

In order to solve such problems, a technique for determining reproduction positions of video data using video analysis information rather than information added to video data (Japanese Patent Laid-Open No. 2004-120553), and a technique for generating a summary of video data (Japanese Patent Laid-Open No. 2006-345554) have been proposed.

In these conventional techniques, proposals are made to make it easier for a user to find an intended scene by using video analysis information, compared with the case where only additional information added to video data is used.

Meanwhile, a technique for freely accessing arbitrary scenes in video data (United States Patent Laid-Open No. 2008/0152299) has been proposed. The basic mechanism of this technique involves extracting the video of portions directly designated with a user interface (UI) in units of frames, and sequentially reproducing and displaying the extracted video according to the operation speed. Increases in the browsing speed of video frames in video data and improvements in operability are sought as a result of this mechanism.

However, with these conventional techniques, important scenes in video data may be overlooked. For example, there is a possibility that important scenes that the user would originally have desired will be dropped from a video data summary obtained using video analysis information, since important-looking scenes are extracted and displayed based totally on the video analysis information. If an important scene that the user desires is missing from a video data summary, the original video data must be checked once again.

Also, similar problems arise in the case of the video data display method for reading video frames from video data, and reproducing and displaying the video frames of arbitrary sections at a reproduction speed that depends on the operation speed. In other words, since the sampling interval of video frames to be reproduced and displayed is fixed, problems arise such as the video frames of important scenes getting dropped, or reproduction and display of the video frames of important scenes being jumpy, making it impossible to grasp the content.

SUMMARY OF THE INVENTION

According to one embodiment of the present invention, a video data display apparatus is provided that is able to sequentially reproduce and display video data in which selected and non-selected sections are mixed, with a single user operation and at an easily viewable reproduction speed.

According to one aspect of the present invention, there is provided a video data display apparatus for reproducing and displaying video data, comprising: a calculation unit configured to calculate an operation speed based on an input user operation; a determination unit configured to determine a reproduction speed according to the operation speed calculated by the calculation unit; and a reproduction unit configured to reproduce video data at the reproduction speed determined by the determination unit, wherein the determination unit acquires section information indicating a section selected from the video data, and, in a case where the calculated operation speed exceeds a prescribed operation speed, determines the reproduction speed to be used by the reproduction unit, such that a reproduction speed of video data belonging to the selected section indicated by the section information is slower than a reproduction speed of video data not belonging to the selected section.

Further features of the present invention will become apparent from the following description of exemplary embodiments with reference to the attached drawings.

BRIEF DESCRIPTION OF THE DRAWINGS

FIG. 13 is a diagram illustrating a relation between operation speed and reproduction speed.

DESCRIPTION OF THE EMBODIMENTS

Hereinafter, embodiments of the present invention will be described in detail with reference to the accompanying drawings. The embodiments that will be described hereinafter are intended to show examples of cases where the present invention is specifically carried out.

First Embodiment

Figure 1A:
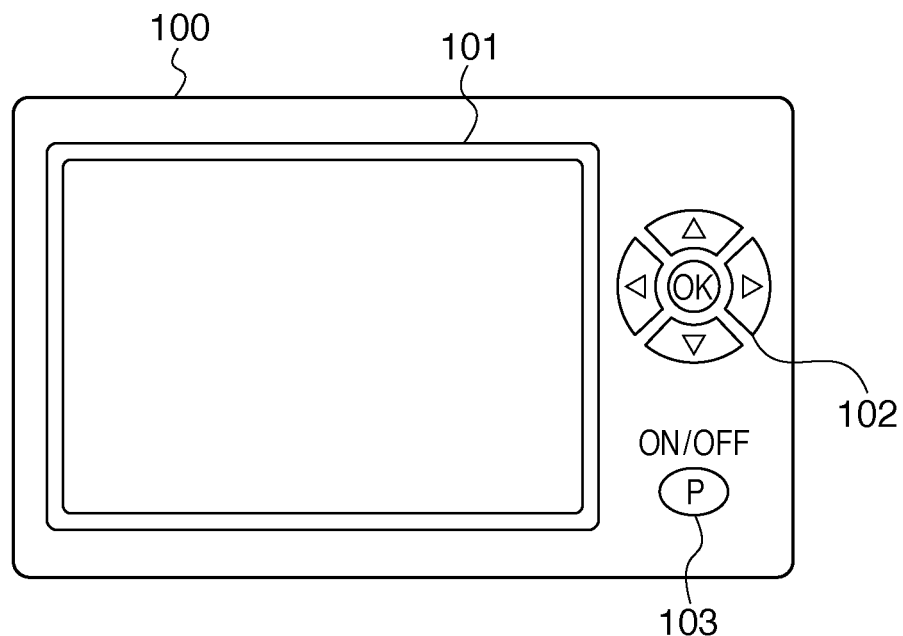
FIGS. 1A and 1B are diagrams showing an external view of a system of a video data display apparatus in first to third embodiments.

FIG. 1A is an external view of a basic system of a video data display apparatus in a first embodiment of the present invention. As shown in FIG. 1A, a video data display apparatus 100 is equipped with a display 101 for displaying digital data, operation buttons 102 for performing operation input, and a power button 103 for turning power to the video data display apparatus 100 ON/OFF. Note that the video data display apparatus 100 may have a function of capturing still images or video, in which case the video data display apparatus 100 will constitute a digital camera or a digital video camera.

Figure 1B:
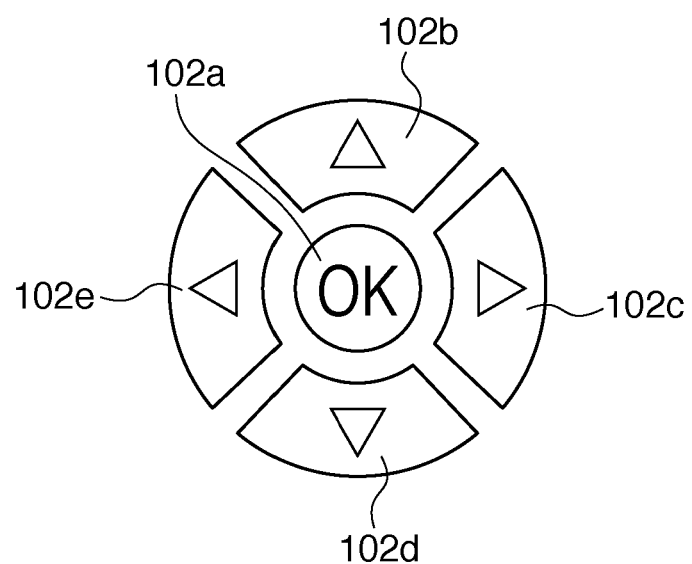

FIG. 1B is a diagram showing an example of the operation buttons 102. The operation buttons 102 of the present embodiment are constituted by an up button 102b, a down button 102d, a left button 102e, a right button 102c, and an OK button 102a for confirming a selection.

Figure 2:
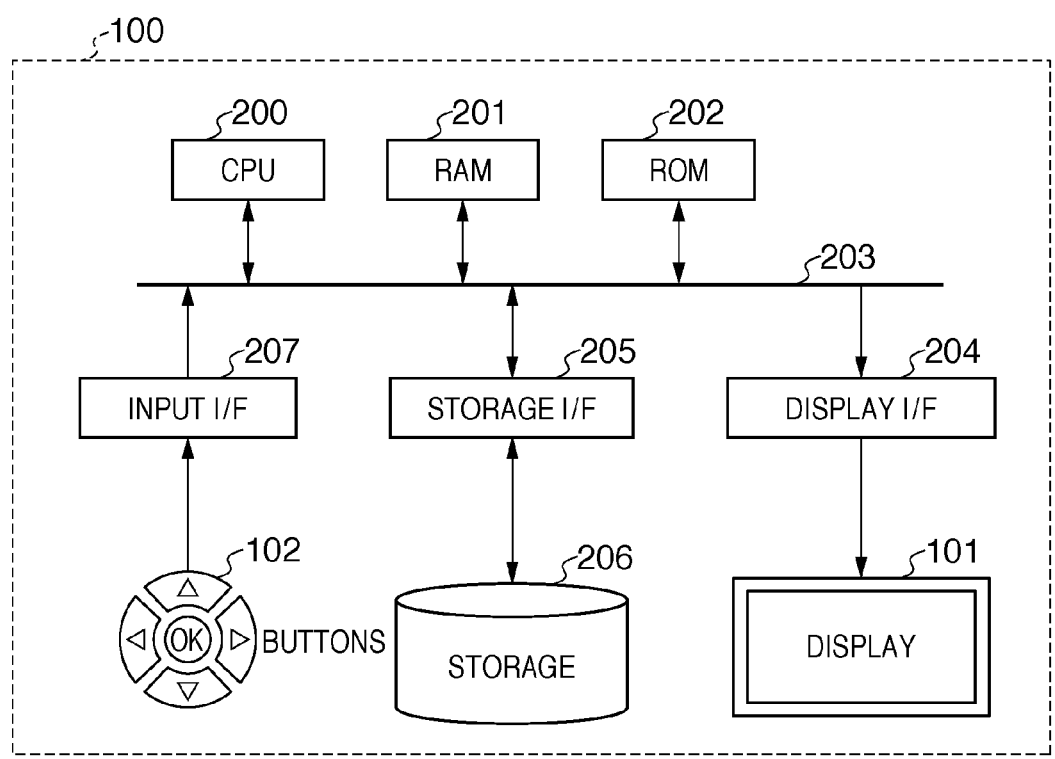
FIG. 2 is a diagram showing a hardware configuration of the video data display apparatus in the first to third embodiments.

FIG. 2 is a block diagram showing an example hardware configuration of the video data display apparatus 100 in the first embodiment of the present invention. As shown in FIG. 2, the video data display apparatus 100 of the present embodiment is equipped with a CPU 200, a RAM 201, a ROM 202, and a bus 203. Further, the video data display apparatus 100 is also equipped with a display I/F (interface) 204, a storage I/F 205, a storage 206, and an input I/F 207.

Note that the present invention is not limited to these interfaces. The present invention may include interfaces such as a touch panel interface and a memory card interface, and may perform reproduction and display of video data using these interfaces.

Hereinafter, the hardware configuration of the video data display apparatus 100 will be described in detail. Note that hereinafter, unless particularly noted, constituent elements that are given the same reference numerals in the drawings indicate the same elements.

The CPU 200 performs control of the entire video data display apparatus 100 using the RAM 201, the ROM 202 and the bus 203.

While not illustrated, processing programs and device drivers according to the present invention, including an operating system (hereinafter denoted as OS), are stored in the ROM 202, temporarily stored in the RAM 201 as appropriate, and executed by the CPU 200. Here, the OS, processing programs and the like may be stored in the storage 206, and in this case are appropriately read to the RAM 201 when the video data display apparatus is powered on, and started by the CPU 200.

The display interface 204 converts display screens generated in the video data display apparatus 100 to signals that are processible by the display 101. The storage interface 205 converts a data format usable in the video data display apparatus 100 and a data format for storing in the storage 206 one to the other. The input interface 207 receives input signals from the operation buttons 102 and the power button 103, and converts the received input signals to information processible by the video data display apparatus 100.

The storage 206 is a mass information storage device typified by a hard disk drive, and video data for being reproduced and displayed by the video data display apparatus 100 is recorded in the storage 206. The storage 206 itself may be mounted in the video data display apparatus 100, or may be connected to the video data display apparatus 100 via any of a variety of interfaces such as an Ethernet® or a USB. Also, a plurality of storages 206 may be connected at that time.

Figure 3:
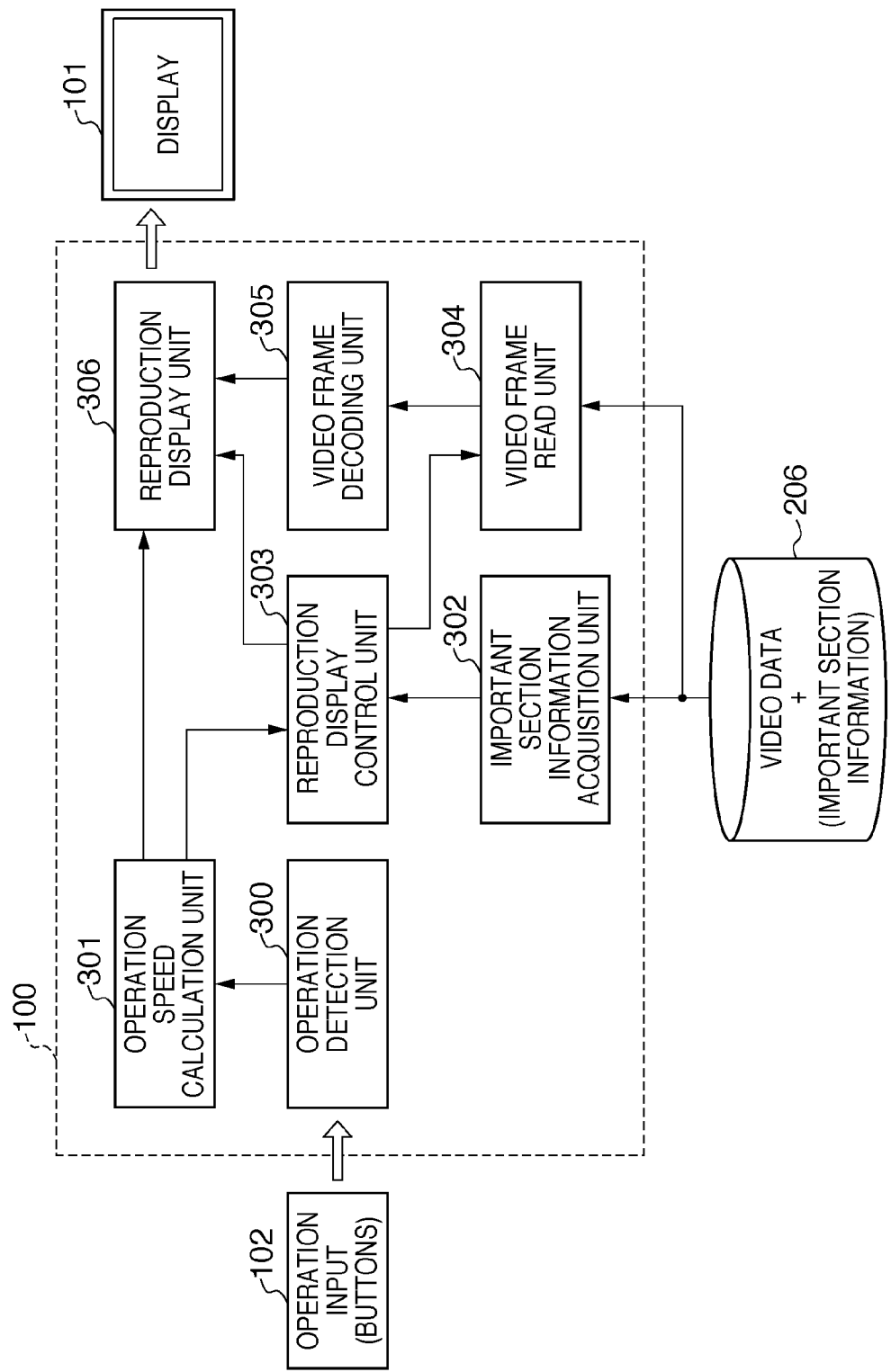
FIG. 3 is a diagram showing functional blocks of the video data display apparatus in the first and second embodiments.

FIG. 3 is a functional block diagram of the video data display apparatus 100 in the first embodiment of the present invention. As shown in FIG. 3, the video data display apparatus 100 is equipped with an operation detection unit 300, an operation speed calculation unit 301, an important section information acquisition unit 302, and a reproduction display control unit 303. Further, the video data display apparatus 100 is also equipped with a video frame read unit 304, a video frame decoding unit 305, and a reproduction display unit 306. These functional blocks are able to realize various embodiments by combining hardware and software. Hereinafter, the units shown in FIG. 3 will be described.

In the first embodiment, digital data stored in the storage 206 is primarily video data, and important section information indicating important sections of video is also stored together with video data. Important section information is information indicating selected sections that have been selected based on video analysis information obtained by analyzing the video data, and, as will be discussed later using FIG. 4, indicates a start frame and an end frame of each important section (selected section). Video analysis information is information indicating visual and audible states of video data when reproduced, such as voice level, music level, face detection, motion detection and the like, obtained by analyzing the video data. For example, the voice level is primarily the level of (people's) voices included in video data, and the music level is primarily the level of music (volume of vocals+instruments, etc.) included video data. In the case where the content of video data is a music program or the like, the video is separated into portions of narration by the master of ceremonies (MC portions) as "voice" and performance portions as "music", and these levels (voice level, music level) are used in an importance level determination. Note that the important section information acquisition unit 302 is assumed to generate selected section information indicating selected sections that have been selected by analyzing in advance video data stored in the storage 206, and store the selected section information in the storage 206 as important section information in association with the video data. Alternatively, video analysis information relating to video data may be stored in the storage 206, and, when reproducing the video data, the important section information acquisition unit 302 may extract important sections based on the video analysis information of the video data and generate important section information. In this case, the video analysis information is stored in the storage 206 in association with the video data. Alternatively, acquisition of video analysis information may also be performed when the video data is reproduced.

Note that while video data is assumed to be constituted by a plurality of video frames, use of the first embodiment is not intended to be limited only to this data and data format. For example, the data may be video data in non-frame format, still image data, music data, or digital data composed of office documents. For example, the case is given where, in an application for sequentially reproducing and displaying an office document having a plurality of pages in units of pages according to an input user operation, important pages are displayed at a slow speed. Alternatively, the first embodiment is applicable to an application such as a slideshow application. Also, as an example application for music data, the use case is given where, in an application that sequentially reproduces music data according to an input user operation, hook line (catchy) portions are reproduced at a perceptible reproduction speed, even during fast-forwarding and rewinding operations. Also, digital data of any format is acceptable provided the data is stored in the storage 206 after having been converted to a data format usable in the first embodiment. For example, video frames may be stored in the storage 206 and used, after being extracted at an arbitrary frame interval from MPEG video data.

Note that in the following description, video frames are assumed to be read from the same video data.

Operation of the video data display apparatus 100 in the first embodiment is performed as a result of the user pressing the operation buttons 102 and the power button 103. When the power button 103 is pressed and power to the video data display apparatus 100 is turned ON, the video data display apparatus enters a state where video data can be reproduced and displayed.

To select video data to be reproduced from a plurality of video data stored in the storage 206, the user moves selection of video data using the up button 102b and the down button 102d, and confirms the selection using the OK button 102a, for example. When the video data to be reproduced has been confirmed, the video data display apparatus enters a state where reproduction and display of video data is enabled. When the user presses the right button 102c or the left button 102e of the button input 102 in a state where reproduction and display of video data is enabled, reproduction and display of video data is started.

When reproduction and display is started, operation information on the operation buttons 102 is input to the operation speed calculation unit 301 via the operation detection unit 300, and converted to an operation speed. Also, the converted operation speed is held in the RAM 201, and used by the reproduction display control unit 303 and the reproduction display unit 306. Here, the operation speed calculation unit 301 calculates the operation speed from the interval between button inputs (key inputs) or the number of button inputs (number of key inputs) per unit of time, and information on the button being pressed. Note that information on the button being pressed is, for example, information indicating whether the button being pressed is the "right button" or the "left button". If this information indicates that the right button 102c is being pressed, a positive operation speed (speed for reproduction in the forward direction) is calculated, and if this information indicates that the left button 102e is being pressed, a negative operation speed (speed for reproduction in the backward direction) is calculated.

The video frame read unit 304 reads video frames of video data recorded in the storage 206, according to instructions from the reproduction display control unit 303. The read video frames are held in the RAM 201 of the video data display apparatus 100, and decoded in the video frame decoding unit 305 to a format displayable by the reproduction display unit 306.

The important section information acquisition unit 302 acquires important section information indicating important sections of video data to be reproduced and displayed from the storage 206. The acquired important section information is held in the RAM 201, and used by the reproduction display control unit 303, and by the reproduction display unit 306 via the reproduction display control unit 303. In the first embodiment, video analysis information and important section information based on one or more pieces of video analysis information is used.

At this time, in the case where the video frames and important section information to be read are too large for the RAM 201, the data to be read may be sequentially read and processed after being subdivided. Alternatively, the data to be read may be saved to the storage 206 as swap data that can be immediately read.

The reproduction display unit 306 determines the reproduction speed according to the operation speed held in the RAM 201 by the operation speed calculation unit 301, and sequentially reproduces and displays the video frames decoded by the video frame decoding unit 305 on the display 101, in accordance with this reproduction speed. At this time, the reproduction display control unit 303 controls the reproduction display unit 306 using important section information held in the RAM 201, such that video frames belonging to an important section are reproduced at a slower reproduction speed than video frames not belonging to an important section. In the first embodiment, video frames are reproduced at a reproduction speed corresponding to the operation speed calculated by the operation speed calculation unit 301, with the reproduction speed of video frames belonging to an important section being controlled so as to not exceed a prescribed reproduction speed (maximum perceptible reproduction speed).

Figure 4:
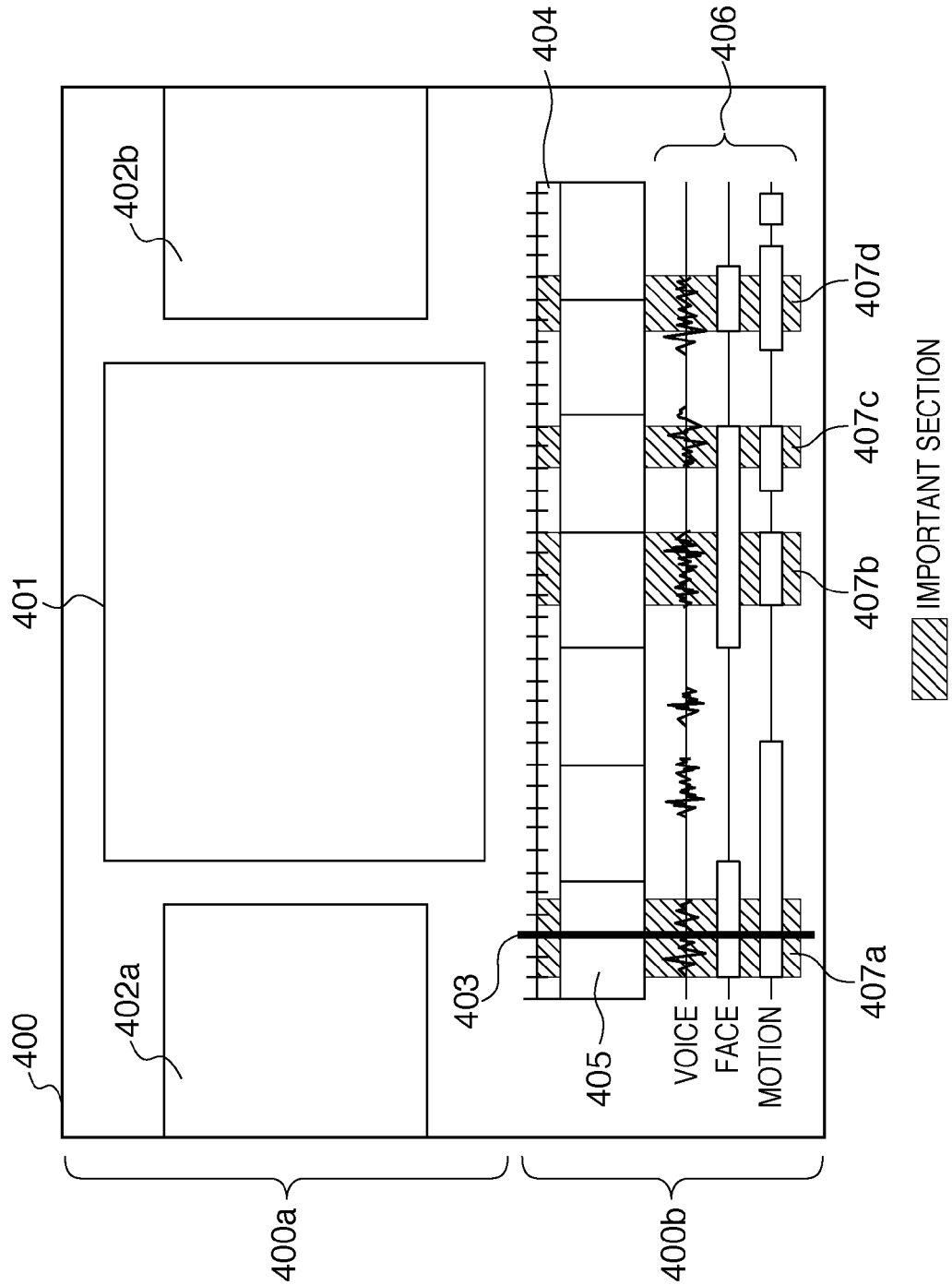
FIG. 4 is a diagram showing an example of an UI screen of the video data display apparatus in the first to third embodiments.
Figure 5:
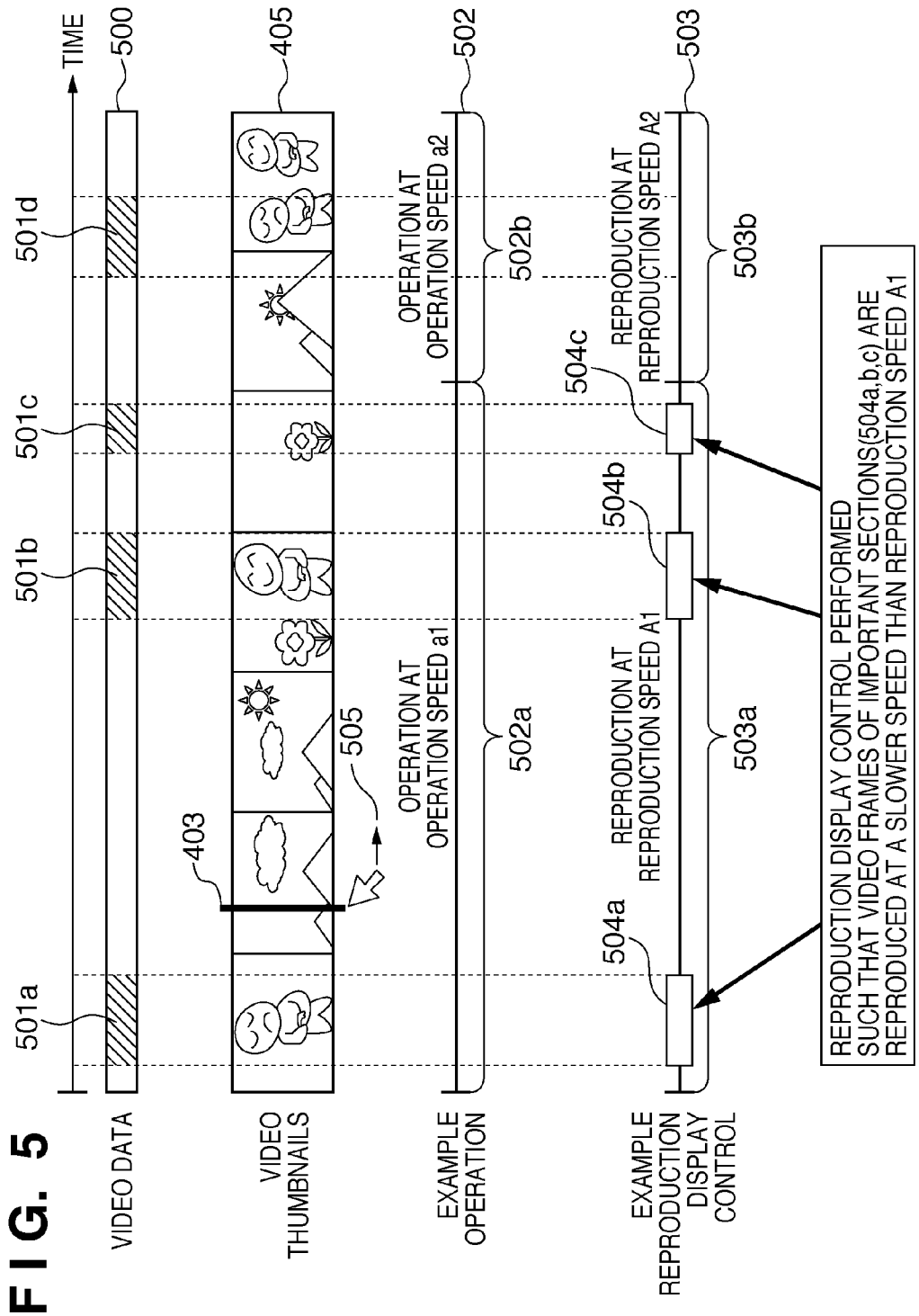
FIG. 5 is a schematic diagram showing a mechanism of a reproduction display control of the video data display apparatus in the first to third embodiments.
Figure 6:
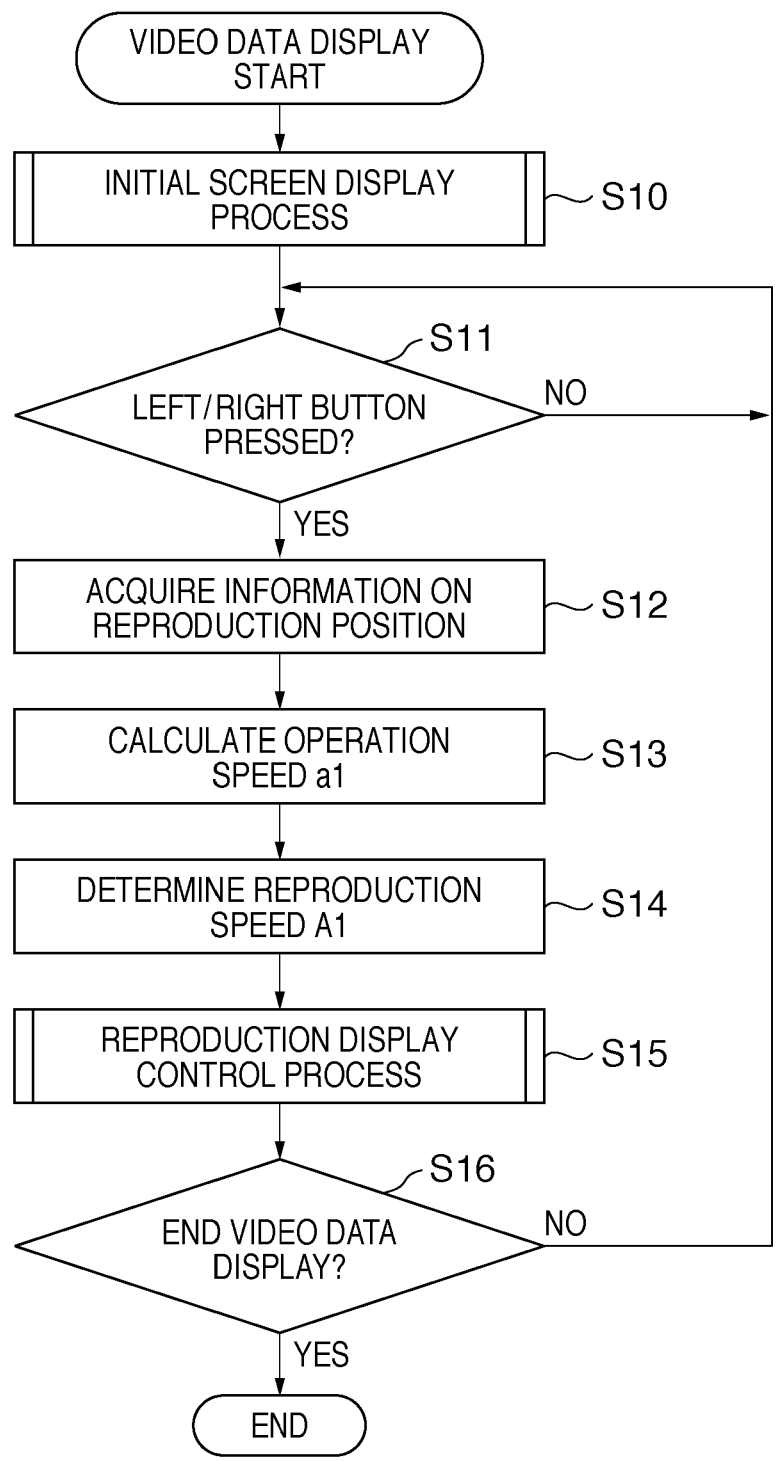
FIG. 6 is a main flowchart showing the flow of processing by the video data display apparatus in the first to third embodiments.

FIG. 4 is an example of a user interface (UI) screen in the first embodiment, and FIG. 5 is a conceptual diagram representing a mechanism for performing reproduction and display in the video data display apparatus 100 of the first embodiment. Also, FIG. 6 is a flowchart showing the flow of processing by the video data display apparatus 100 in the first embodiment. The video data reproduction display process in the first embodiment will be described in detail, with reference to this UI screen, conceptual diagram and flowchart.

When the power button 103 is pressed in the video data display apparatus 100 and power to the video data display apparatus 100 is turned ON, firstly an initial screen display process (S10) is performed.

Figure 7:
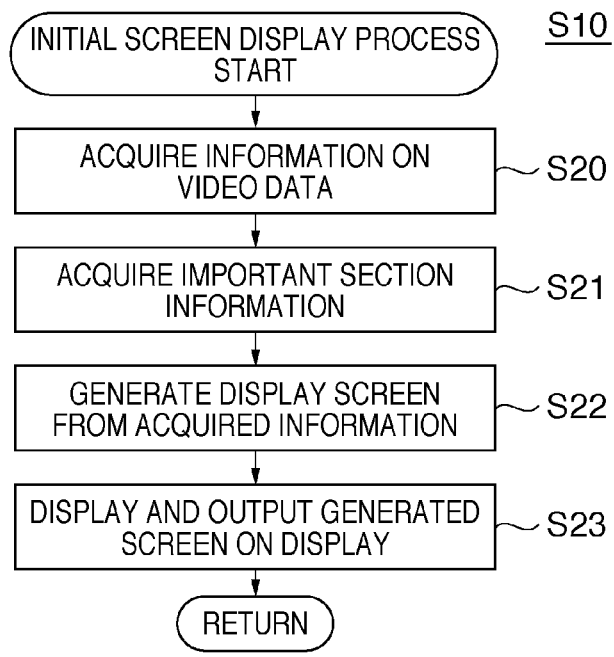
FIG. 7 is a flowchart of an initial screen display process that is executed at a time of the main flowchart processing by the video data display apparatus in the first to third embodiments.

FIG. 7 is a flowchart showing the initial screen display process (S10) in detail. In the initial screen display process, firstly time information, scene index information, representative thumbnail information, and the like of video data to be reproduced is acquired (S20). The acquisition of this information is assumed to be performed by the reproduction display control unit 303. Next, the important section information acquisition unit 302 acquires the important section information of the video data to be reproduced (S21). The reproduction display unit 306 generates an initial screen using the information acquired at S20 and S21 (S22), and causes the display 101 to display the initial screen (S23). The initial screen displayed on the display 101 at this time is the example of the UI screen shown in FIG. 4.

Here, the configuration of the UI screen in the present embodiment will be described.

As shown in FIG. 4, a UI screen 400 has a preview display area 400a (upper portion of screen) and an analysis information display area 400b (lower portion of screen). Video frames of targeted video data are displayed in a display area 401 of FIG. 4, and video frames, title information or representative thumbnails of other video data are displayed in a display area 402a and a display area 402b. As abovementioned, in the case where an operation to switch video data to be reproduced is performed using the up button 102b or the down button 102d, the content of video data corresponding to the display area 402a or the display area 402b is displayed in the display area 401.

A reproduction head 403 represents the position in the video data of the video frame currently being reproduced and displayed by the video data display apparatus 100, by association with a timeline 404. Also, reference numeral 405 denotes a thumbnail display area. A plurality of representative thumbnails of scenes or segments of targeted video data are displayed in the thumbnail display area 405.

Further, the video frame in the video data corresponding to the position at which the reproduction head 403 and the timeline 404 intersect is displayed in the display area 401. When the right button 102c or the left button 102e is pressed at this time, the reproduction head 403 moves, and previewed video frames are updated and displayed in succession following the movement of the reproduction head. Also, thumbnail images of video frames to be previewed may, at this time, be displayed at the position where the reproduction head 403 and the thumbnail display area 405 intersect. In other words, display of thumbnails of portions where the reproduction head 403 is positioned may be updated in succession, in accordance with the movement of the reproduction head 403.

Reference numeral 406 in FIG. 4 indicates video analysis information, and in the first embodiment, indicates the result of extracting video ranges using the video analysis information of voice level, music level, face detection, and motion detection (ranges for which respective video analysis information satisfies a prescribed condition). The important section information acquisition unit 302 acquires important section information indicating portions where these three pieces of video analysis information coincide. Alternatively, the important section information acquisition unit 302 may acquire these three pieces of video analysis information, and acquire portions in which sections extracted using the pieces of video analysis information coincide as important section information. Further, the important section information acquisition unit 302 may acquire video analysis information 406 in real time by analyzing the video data to be reproduced, determine important sections, and generate important section information to be used by the reproduction display control unit 303. Reference numeral 407a, 407b, 407c and 407d in FIG. 4 denote important sections of video data acquired by the important section information acquisition unit 302.

The initial screen display process (S10) is completed with the above processing, and the result thereof is returned to the processing of the call source.

When the initial screen display process (S10) has ended, the operation speed calculation unit 301 and the reproduction display control unit 303 judge whether the right button 102c or the left button 102e has been pressed (S11). If the right button 102c or the left button 102e has not been pressed (NO at S11), no action is taken, and the processing again moves to S11, forming a processing standby loop. If the right button 102c or the left button 102e has been pressed (YES at S11), the reproduction display control unit 303 acquires information on the reproduction position, or in other words, acquires a video frame read position (S12). Also, the operation speed calculation unit 301 calculates an operation speed a1 from button operation information (S13). The reproduction display control unit 303 determines a reproduction speed A1 that depends on the operation speed a1 calculated by the operation speed calculation unit 301 (S14). After the video frame read position, the operation speed a1 and the reproduction speed A1 have thus been held in the RAM 201, the reproduction display control unit 303 starts a reproduction display control process (S15).

Figure 8:
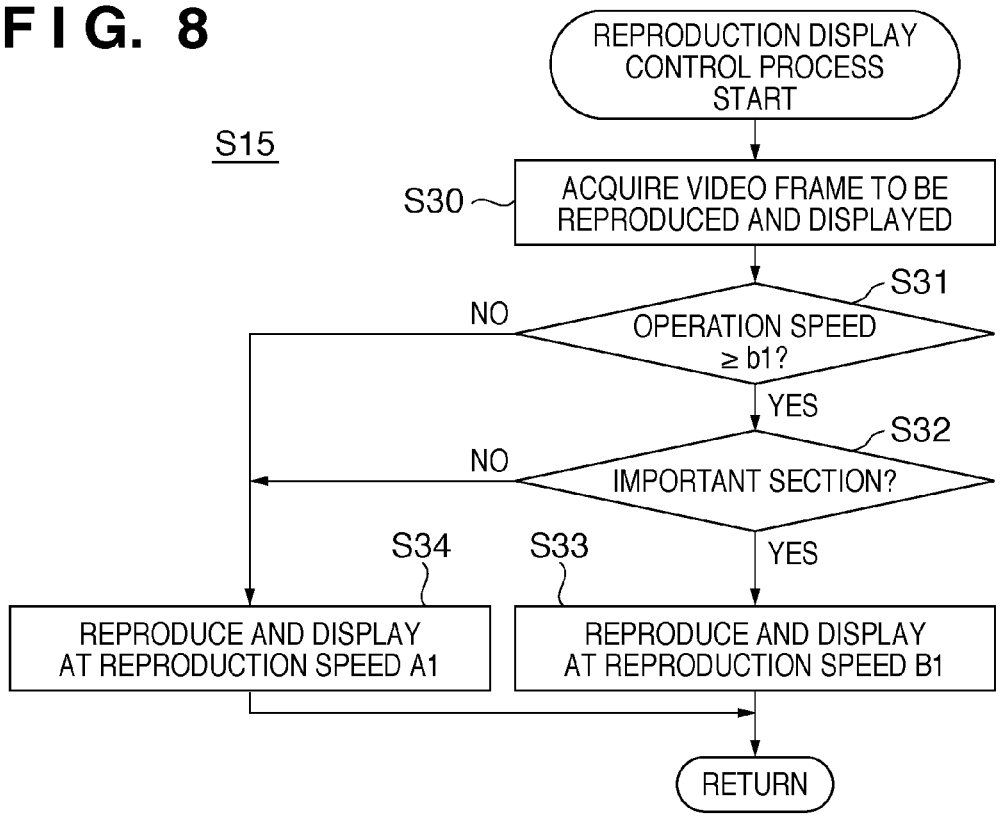
FIG. 8 is a flowchart of a reproduction display control process that is executed at a time of the main flowchart processing by the video data display apparatus in the first and second embodiments.

FIG. 8 is a flowchart showing the reproduction display control process (S15) by the reproduction display control unit 303. When the reproduction display control process has been started, the reproduction display control unit 303 firstly reads a video frame to be reproduced and displayed, using the information on the video frame read position held in the RAM 201 at step S12 (S30).

Next, the reproduction display control unit 303 reads the operation speed a1 held in the RAM 201 at step S13, and compares the operation speed a1 with an operation speed b1 (S31). Here, the operation speed b1 is a prescribed operation speed specified in advance by the video data display apparatus 100. For example, the maximum operation speed for restricting reproduction of important sections to a reproduction speed perceptible to the user is specified as the operation speed b1. If the operation speed a1 is less than the operation speed b1 (NO at S31), the operation speed A1 determined at step S14 according to the operation speed a1 is extracted from the RAM 201, and the video frame is reproduced and displayed at the operation speed A1 (S34). Note that in the case where the calculated operation speed a1 is positive or negative according to the reproduction direction, the magnitude comparison of the above operation speeds is performed using the absolute value of the operation speed.

On the other hand, if the operation speed a1 is greater than or equal to the operation speed b1 (YES at S31), it is judged whether the video frame extracted at step S30 is a video frame belonging to an important section, using the important section information that the important section information acquisition unit 302 is able to acquire (S32). If the extracted video frame does not belong to an important section (NO at S32), the video frame is reproduced and displayed at the reproduction speed A1 that depends on the operation speed a1 (S34). On the other hand, if the extracted video frame does belong to an important section (NO at S32), the video frame is reproduced and displayed at a reproduction speed B1 that depends on the system-specific operation speed b1 (S33). Here, the reproduction speed B1 that depends on the prescribed operation speed b1 is a reproduction speed at which video frames of an important section are perceptible, and may be any reproduction speed without necessarily being the reproduction speed B1, provided it is slower than the reproduction speed A1. The case of the reproduction speed being zero is, however, excluded.

The reproduction display control process is completed with the above processing, and the result thereof is returned to the processing of the call source.

When the reproduction display control process (S15) has ended, it is judged whether to end video data display by the video data display apparatus 100. In the present embodiment, whether to end video data display is judged by the pressing of the power button 103. In the case of not ending video data display (NO at S16), the processing from S11 is started again. In the case of ending video data display (YES at S16), power to the video data display apparatus 100 is turned OFF, and all processing is completed. Note that in the above description, description relating to stopping reproduction of video data, switching video data and the like was omitted, although such processing is well known, and would be obvious to those skilled in the art.

The processing thus far will be described using FIG. 5. Reference numeral 500 in FIG. 5 denotes video data, and reference numerals 501a, 501b, 501c and 501d denote important sections of the video data. Also, representative thumbnails of scenes or segments of the video data are displayed in the thumbnail display area 405 as shown in FIG. 5.

For example, assume that the user operates the reproduction head 403 using the left/right buttons (102c, 102e), as shown by reference numeral 505 in FIG. 5, and that the operation speed in a section 502a is a1 and the operation speed in a section 502b is a2, as shown by an example operation 502 in FIG. 5. Note that a1 and a2 satisfy the relation (a2<b1<a1) with respect to the system-specific operation speed b1.

At this time, reproduction and display of respective video frames are performed at the reproduction speed A1 that depends on the operation speed a1 in a section 503a, and at a reproduction speed A2 that depends on the operation speed a2 in a section 503b, as shown by an example reproduction display control 503 in FIG. 5. However, reproduction display control is performed such that video frames belonging to important sections 504a, 504b and 504c are reproduced at a slower reproduction speed than A1 (e.g., the reproduction speed B1 that depends on the specific operation speed b1).

Also, in the case where video frames belonging to an important section are reproduced slower than video frames not belonging to an important section depending on the operation speed, it is foreseen that inconveniences will arise with feedback to the UI screen in response to user operations. In order to mitigate this problem, control may be additionally performed to reproduce and display video frames not belonging to an important section faster than the reproduction speed A1 for a period equal to that for which video frames belonging to an important section are reproduced and displayed slowly.

Also, in the above embodiment, control was performed to restrict the reproduction speed of important sections to the reproduction speed B1 corresponding to the operation speed b1, in the case where the operation speed a1 exceeds the operation speed b1. That is, the reproduction speed is fixed at B1, for operations speeds greater than or equal b1, such as shown by reference numeral 1401 in FIG. 13. However, the concept of the present embodiment is to make the reproduction speed of video frames belonging to important sections slower than video frames belonging to other sections, in the case where the operation speed exceeds a prescribed operation speed, and is not limited to the above embodiment. For example, the reproduction speed of video frames belonging to important sections corresponding to the operation speed a1 may be determined as shown by reference numeral 1402 of FIG. 13, in the case where the operation speed exceeds b1.

Figure 9:
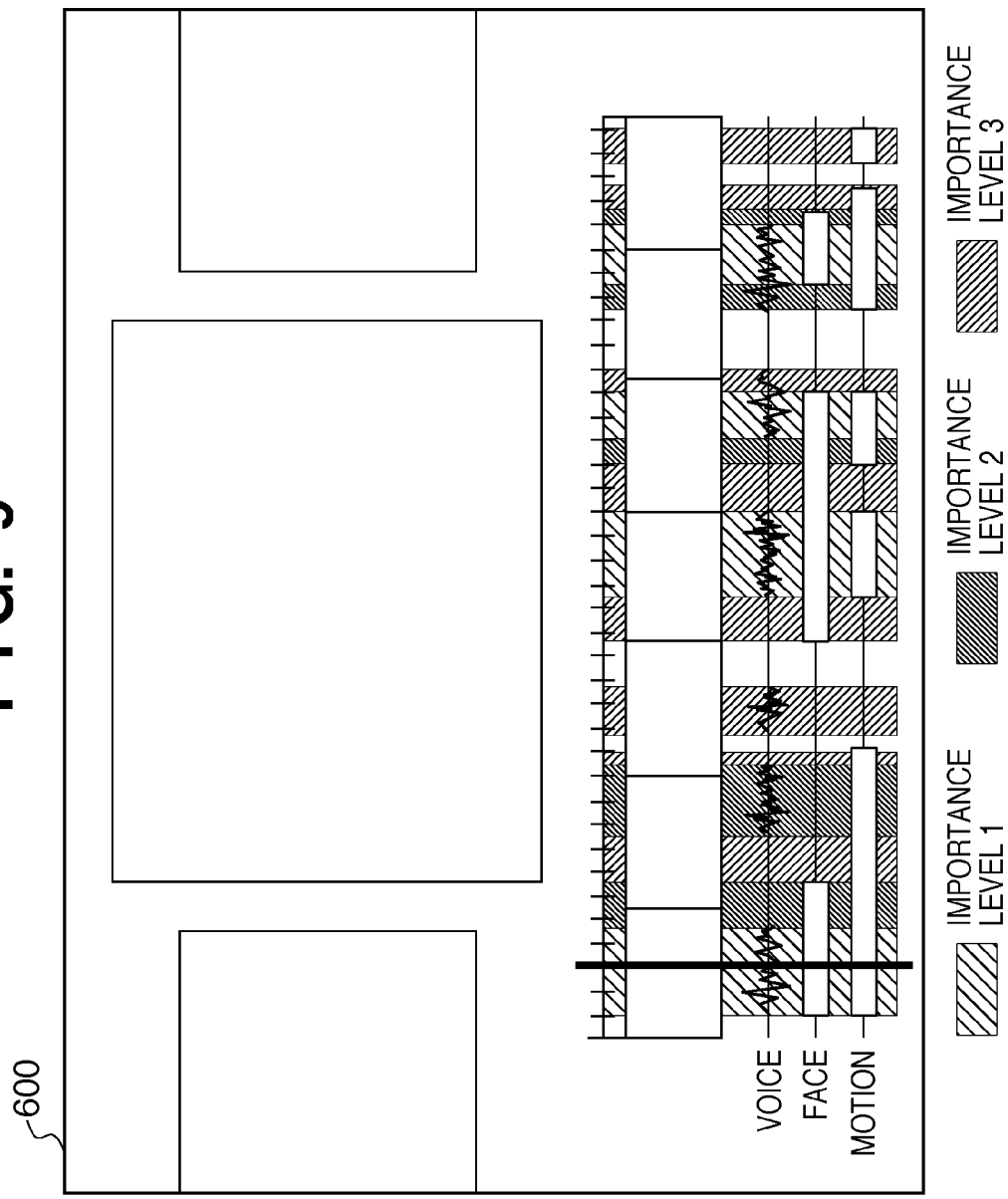
FIG. 9 is a diagram showing an example of an UI screen of the video data display apparatus in the first embodiment.

Also, as shown in FIG. 9, an UI screen may be generated after acquiring important section information sorted into a plurality of importance levels with the important section information acquisition unit 302. In the case of FIG. 9, sections in which three analysis results coincide are set as sections with an importance level 1, sections in which two analysis results coincide are set as sections with an importance level 2, and sections in which there is only one analysis result are set as sections with an importance level 3, using the analysis information of voice level, face detection and motion detection. At this time, the reproduction display unit 306 can also be controlled so as to reproduce and display video frames belonging to the important sections of each level slowly according to the importance level, at a reproduction speed corresponding to the respective importance level. For example, conversion information indicating b1 serving as the prescribed operation speed and the relation between operation speeds and slower reproduction speeds after the operation speed b1 is exceeded is set for each of the plurality of levels. The reproduction speed of video frames belonging to an important section is then determined using the conversion information set for the level of that important section.

By providing a video data display apparatus 100 such as discussed above in the first embodiment, important sections of video data can be sequentially reproduced and displayed with a single user operation and at an easily viewable reproduction speed.

As a result, the content of video data can be quickly grasped in a short time. Also, a highly interactive video data reproduction display UI can be realized, since reproduction display control is performed according to the operation speed.

Second Embodiment

Next, a second embodiment of the present invention will be described in detail with reference to the drawings. Here, the external view of the system, hardware configuration diagram and functional block diagram are similar to the first embodiment described using FIGS. 1, 2, and 3. Note that in the second embodiment, unless particularly noted, the same reference numerals are given to constituent elements that have been described using other diagrams, and description thereof will be omitted.

Figure 10:
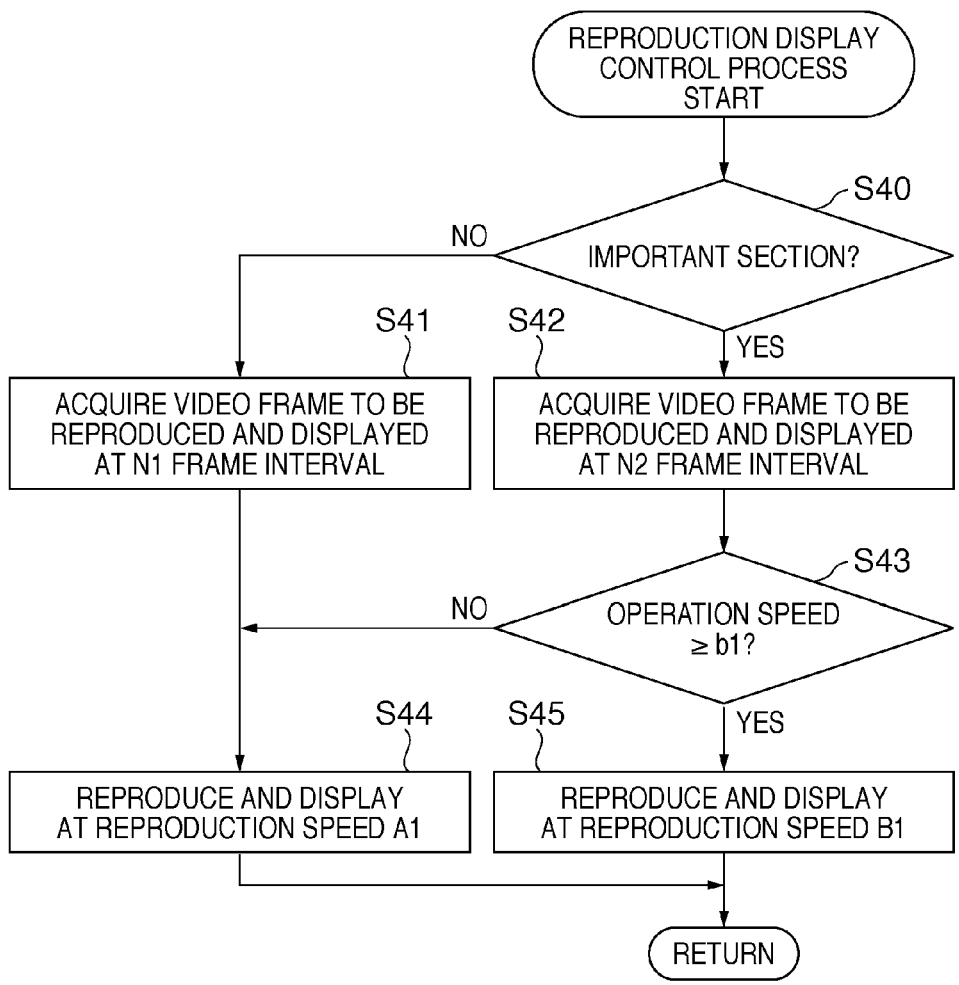
FIG. 10 is a flowchart of a reproduction display control process that is executed at a time of the main flowchart processing by the video data display apparatus in the second embodiment.
Figure 11:
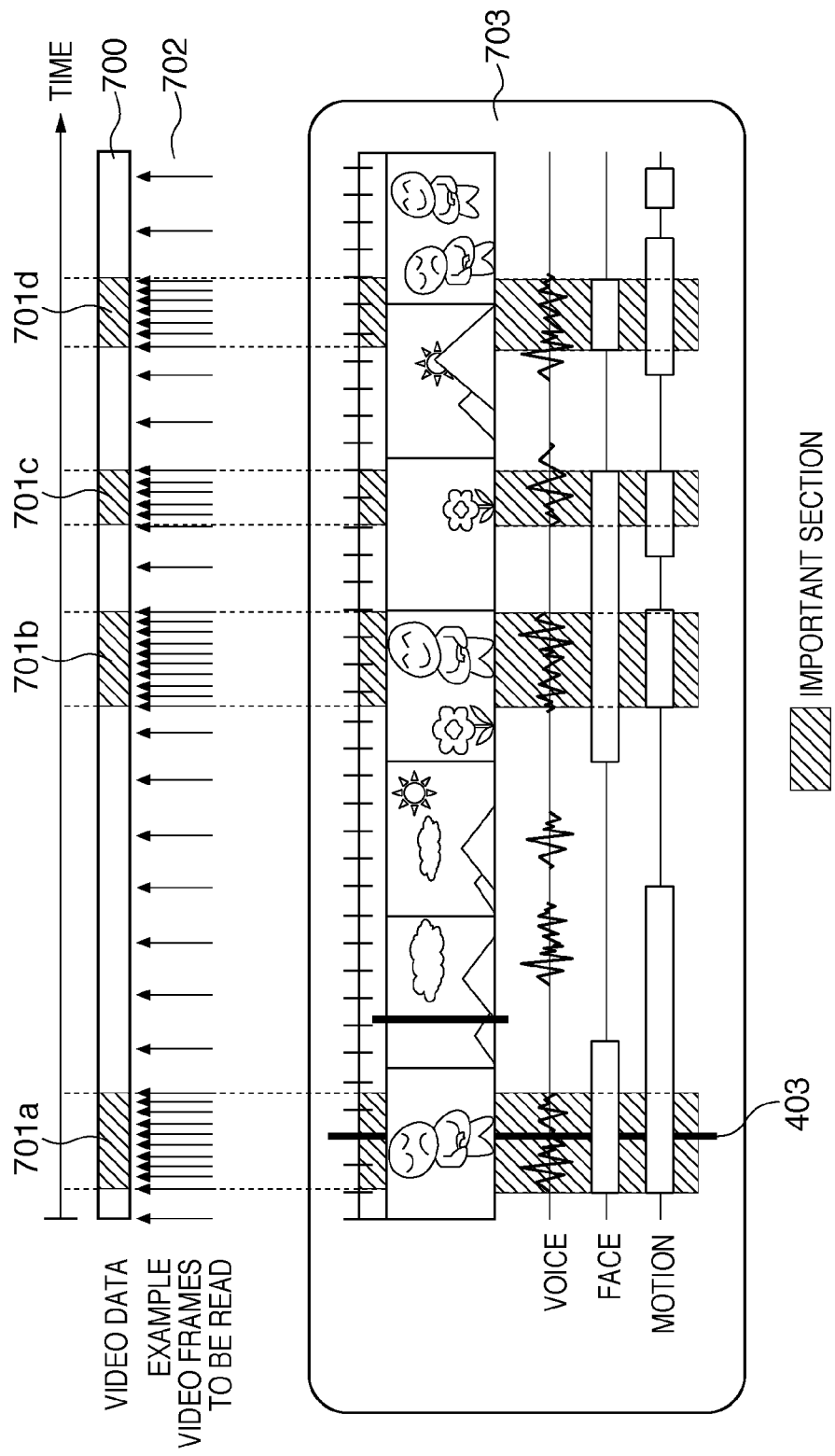
FIG. 11 is a diagram showing a mechanism for reading video frames by the video data display apparatus in the second embodiment.

A difference from the first embodiment is the reproduction display control process (S15) of the flowchart of the video data display apparatus 100 shown in FIG. 6. The processing flow of the reproduction display control process (S15) in the second embodiment is shown in FIG. 10. Also, FIG. 11 is a diagram showing a mechanism for reading video frames by the video data display apparatus 100 in the second embodiment. The difference between the second embodiment and the first embodiment will be described, with reference to these diagrams.

The preprocessing before the reproduction display control process (S15) is started is similar to the first embodiment described using FIGS. 6 and 7. When the reproduction display control process (S15) is started, the reproduction display control unit 303 firstly reads the video frame read position information held at step S12 from the RAM 201, and determines whether the video frame to be read belongs to an important section (S40). If the video frame to be read does not belong to an important section (NO at S40), the reproduction display control unit 303 extracts the video frame to be reproduced and displayed at an N1 frame interval (S41). The reproduction display control unit 303 then extracts the reproduction speed A1 that depends on the operation speed a1 from the RAM 201, and reproduces and displays the video frame at the reproduction speed A1 (S44).

If the video frame to be read does belong to an important section (YES at S40), the reproduction display control unit 303 extracts the video frame to be reproduced and displayed at an N2 frame interval (S42). Here, in the second embodiment, the N2 frame interval is shorter that the N1 frame interval. That is, the interval at which video frames to be reproduced are extracted in the case of reproducing video data belonging to an important section is made shorter than the interval at which video frames to be reproduced are extracted in the case of reproducing video data not belonging to an important section.

Next, the reproduction display control unit 303 extracts the operation speed a1 held at step S13 from the RAM 201, and compares the extracted operation speed with the operation speed b1 (S43). If the operation speed is less than b1 (NO at S43), the reproduction display control unit 303 reproduces and displays the video frame at the reproduction speed A1 that depends on the operation speed a1 (S44). If the operation speed is greater than or equal to b1 (YES at S43), the reproduction display control unit 303 reproduces and displays the video frame at the reproduction speed B1 that depends on the system-specific operation speed b1 (S45). Here, the reproduction speed B1 that depends on the specific operation speed b1 is a reproduction speed at which the video frames of an important section are perceptible.

The reproduction display control process is completed with the above processing, and the result thereof is returned to the processing of the call source. The processing after the reproduction display control process (S15) has ended is similar to the first embodiment described using FIG. 6.

The video frame acquisition process performed in the second embodiment will be described using FIG. 11.

Reference numeral 700 in FIG. 11 denotes video data, and reference numerals 701a, 701b, 701c and 701d denote important sections of the video data. Also, reference numeral 703 denotes the content of the analysis information display area 400b of the example UI screen shown in FIG. 4.

For example, consider the case where the user performs reproduction and display of video frames after operating the reproduction head 403 using the left/right buttons (102c, 102e). In this case, video frames belonging to important sections are read at a shorter frame interval than video frames not belonging to important sections, as shown by the example video frames 702 to be read.

By reproducing and displaying video frames belonging to important sections at a shorter frame interval, as discussed above in the second embodiment, video of important sections can be checked in greater detail than video of other sections, with a single user operation. As a result, the content of video data can be quickly grasped in a short time.

Third Embodiment

Next, a third embodiment of the present invention will be described in detail with reference to the drawings. Here, the external view of the system, hardware configuration diagram and flowchart of the video data display apparatus 100 are similar to the first embodiment described using FIGS. 1, 2 and 6.

Note that in the third embodiment, unless particularly noted, the same reference numerals are given to constituent elements that have been described using other diagrams, and description thereof will be omitted.

Figure 12:
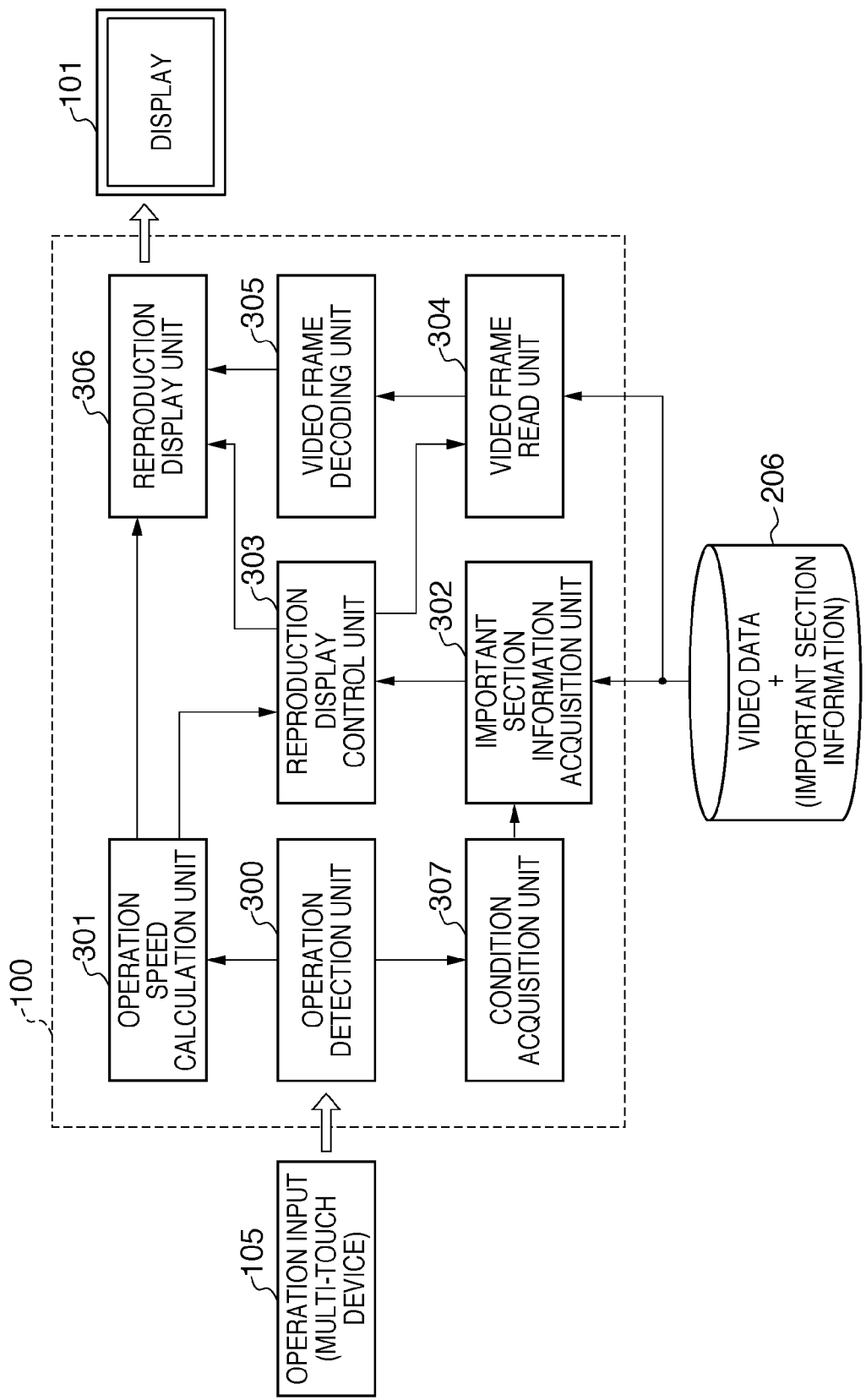
FIG. 12 is a diagram showing functional blocks of the video data display apparatus in the third embodiment.

FIG. 12 is a functional block diagram in the third embodiment. Apart from a condition acquisition unit 307, the functional blocks are similar to the first embodiment described using FIG. 3. That is, differences between the third embodiment and the first embodiment are that the condition acquisition unit 307 has been added as a functional block, and that operation input has changed from buttons to a multi-touch device 105 serving as a pointing device. The pointing device is, however, not limited to the multi-touch device 105, and may be a mouse.

In the third embodiment, it is made possible, using the multi-touch device 105, to designate an analysis item to be used in selecting important sections, out of a plurality of analysis items of video analysis information such as voice level, music level, face detection and motion detection obtained by analyzing video data. For example, conditions (analysis items) of video analysis displayed on the UI screen of FIG. 4 can be designated, and a plurality of conditions can be arbitrary combined and designated at the same time. That is, one or more conditions (analysis items) designated using the multi-touch device 105 are converted to video analysis conditions to be used by the condition acquisition unit 307, via the operation detection unit 300, held in the RAM 201, and used by the important section information acquisition unit 302. The important section information acquisition unit 302 acquires important section information that is based on information obtained through video analysis of the designated conditions from the storage 206.

For example, assume that the condition acquisition unit 307 has received, by touch input, designation of the analysis items of voice level, face detection and motion detection, and an instruction to set sections in which sections extracted using two analysis items coincide as important sections. In this case, the condition acquisition unit 307 extracts, as important sections, sections in which sections extracted using two analysis items coincide, from the sections extracted using the analysis results of the respective analysis items of voice level, face detection and motion detection. In this case, the sections of importance level 2 in FIG. 9 will be extracted as important sections. Of course, a plurality of types of important section information corresponding to combinations of analysis information may be set for video data, and important section information corresponding to the combination of analysis information designated by a touch input may be acquired.

Also, if the multi-touch device 105 is used, a combination of the analysis information of voice level and face detection or a combination of the analysis information of voice level and motion detection, for example, can be directly designated at the same time by multi-touching with two fingers. Further, in the third embodiment, the reproduction head 403 is operated by moving the two fingers used to designate the combination of analysis information left or right while still multi-touching, rather than by pressing the left/right buttons (102c, 102e). Of course, the left/right buttons (102c, 102e) may be operated.

Also, the operation speed calculation unit 301 calculates the operation speed at this time from the average amount of change in coordinate points that are multi-touched per unit of time.

By providing the video data display apparatus discussed above in the third embodiment, a video data reproduction display process can be realized with a more intuitive and easy-to-use user interface.

According to the present invention, video data in which selected sections and non-selected sections are mixed can be sequentially reproduced and displayed with a single user operation and at an easily viewable reproduction speed.

Other Embodiments

Aspects of the present invention can also be realized by a computer of a system or apparatus (or devices such as a CPU or MPU) that reads and executes a program recorded on a memory apparatus to perform the functions of the above-described embodiment(s), and by a method, the steps of which are performed by a computer of a system or apparatus by, for example, reading and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-069007, filed Mar. 19, 2009, which is hereby incorporated by reference herein in its entirety.

What is claimed is:

1. A video data display apparatus for reproducing and displaying video data, comprising:
a calculation unit configured to calculate an operation speed based on an input user operation;
an obtaining unit configured to obtain section information indicating a specific section of the video data based on video analysis information corresponding to one or more analysis item designated by said user operation from a plurality analysis items for the video data;
a deciding unit configured to decide a first reproduction speed corresponding to the operation speed calculated by said calculation unit, and decide a second reproduction speed for reproducing the video data belonging to the section indicated by the section information at a speed lower than the first reproduction speed in case that the video data belonging to the section is going to be reproduced in a condition that the calculated operation speed is faster than a prescribed operation speed, wherein the prescribed operation speed includes a maximum prescribed speed for perceptible video reproduction;
a reproduction unit configured to reproduce the video data at a reproduction speed decided by said deciding unit,
wherein said deciding unit decides, when said deciding unit decides the second reproduction speed, a third reproduction speed faster than the first reproduction speed based on the second reproduction speed and the operation speed, and
said reproduction unit reproduces video data that is not belonging to the section at the third reproduction speed in case that video data belonging to the section is reproduced at the second reproduction speed because the calculated operation speed exceeds the prescribed operation speed.

2. The apparatus according to claim 1 further comprising a reception unit configured to receive a user operation that designates a combination of analysis items from a plurality of analysis items that analyze the video data,
wherein said obtaining unit obtains the section information based on analysis information corresponding to the combination designated by the user operation received by said reception unit.

3. The apparatus according to claim 2, wherein said reception unit receives user's multi-touch input on a screen where the plurality of analysis items are expressly displayed as user's operation that designates a combination of analysis items corresponding to multi-touched coordinates.

4. The apparatus according to claim 3, wherein said calculation unit calculates the operation speed based on a change of each multi-touched coordinate on the screen.

5. The video data display apparatus according to claim 1, wherein the reproduction unit reproduces video data in a forward direction or a backward direction, according to the user operation.

6. The video data display apparatus according to claim 1, wherein the section information indicates the specific section selected from the video data, based on video analysis information that is obtained by analyzing the video data and indicates at least one of a visual state or an auditory state at a time of reproducing the video data.

7. The video data display apparatus according to claim 6, wherein the video analysis information includes at least one of voice level, music level, face detection, motion detection, and video change amount of the video data.

8. The video data display apparatus according to claim 6, further comprising:
a generation unit configured to acquire the video analysis information by analyzing the video data, and generate, as the section information, information showing a section for which the acquired video analysis information satisfies a prescribed condition as the specific section.

9. The video data display apparatus according to claim 1, wherein the section information indicates the specific section that is sorted into one of a plurality of levels,
conversion information indicating the prescribed operation speed and a relation between the calculated operation speed and a slower reproduction speed is set for each of the plurality of levels, and
the determination unit determines the second reproduction speed, using the conversion information set for the level of the specific section.

10. The video data display apparatus according to claim 6, wherein a plurality of types of section information each indicating a section selected based on video analysis information of a different analysis item are set for the video data, and
the determination unit selects one of the plurality of types of section information according to a user operation.

11. A method of controlling a video data display apparatus for reproducing and displaying video data, comprising:
a calculation step of calculating an operation speed based on an input user operation;
an obtaining step of obtaining section information indicating a specific section of the video data based on video analysis information corresponding to one or more analysis item designated by said user operation from a plurality analysis items for the video data;
a deciding step of deciding a first reproduction speed corresponding to the operation speed calculated in said calculation step, and decide a second reproduction speed for reproducing the video data belonging to the section indicated by the section information at a speed lower than the first reproduction speed in case that the video data belonging to the section is going to be reproduced in a condition that the calculated operation speed is faster than a prescribed operation speed, wherein the prescribed operation speed includes a maximum prescribed speed for perceptible video reproduction;
a reproduction step of reproducing the video data at a reproduction speed decided in said deciding step,
wherein in said deciding step, when the second reproduction speed is decided, a third reproduction speed faster than the first reproduction speed is decided based on the second reproduction speed and the operation speed, and
in said reproduction step, video data that is not belonging to the section is reproduced at the third reproduction speed in case that video data belonging to the section is reproduced at the second reproduction speed because the calculated operation speed exceeds the prescribed operation speed.

12. The method according to claim 11 further comprising a reception step of receiving a user operation that designates a combination of analysis items from a plurality of analysis items that analyze the video data, wherein in said obtaining step, the section information is obtained based on analysis information corresponding to the combination designated by the user operation received in said reception step.

13. The method according to claim 12, wherein in said reception step, user's multi-touch input on a screen where the plurality of analysis items are expressly displayed is received as user's operation that designates a combination of analysis items corresponding to multi-touched coordinates.

14. The method according to claim 13, wherein, in said calculation step, the operation speed is calculated based on a change of each multi-touched coordinate on the screen.

15. A non-transitory computer-readable storage medium storing a computer program for causing a computer to execute the video data display method according to claim 11.

* * * * *